United States Patent
Yamamoto et al.

[11] Patent Number: 5,202,723
[45] Date of Patent: Apr. 13, 1993

[54] METHOD AND DEVICE FOR DRIVING A MIRROR FOR A PHOTOGRAPHIC PRINTER

[75] Inventors: Takashi Yamamoto; Yoshio Ozawa, both of Kanagawa, Japan

[73] Assignee: Fuji Photo Film Co., Ltd., Kanagawa, Japan

[21] Appl. No.: 859,954

[22] Filed: Mar. 30, 1992

[30] Foreign Application Priority Data

Apr. 1, 1991 [JP] Japan .................. 3-94702

[51] Int. Cl.$^5$ .................................. G03B 13/28
[52] U.S. Cl. ............................ 355/45; 355/43; 355/51; 355/57; 355/60; 355/65; 355/66
[58] Field of Search ............ 355/43, 45, 51, 57, 355/60, 65, 66

[56] References Cited

U.S. PATENT DOCUMENTS

| | | |
|---|---|---|
| 3,601,486 | 8/1971 | Levine .................. 355/645 |
| 3,620,623 | 11/1971 | Reams et al. ............ 355/45 |
| 4,457,619 | 7/1984 | Takahashi et al. ........ 355/60 |
| 4,786,944 | 11/1988 | Sakamoto et al. ........ 355/43 |
| 4,786,949 | 11/1988 | Yamamoto .............. 355/66 |
| 5,006,886 | 4/1991 | Suzuki . |

Primary Examiner—Monroe H. Hayes
Attorney, Agent, or Firm—Sughrue, Mion, Zinn, Macpeak & Seas

[57] ABSTRACT

A mirror driving method, and device, for a photographic printer having a mirror diagonally movable into and out of a printing light path between a photographic film and a printing lens. The mirror is moved into the printing light path for reflecting light toward a photometric system of the photographic printer during light measurement before printing. During printing, the mirror is removed from the printing light path and is stopped at a rest position. When moving from the rest position into the printing light path, the mirror is controlled to move first at a high speed and then at a low speed. When the printer operation is interrupted for a period or terminated, the mirror is locked at a lock position which is removed from the printing light path.

17 Claims, 6 Drawing Sheets

METHOD AND DEVICE FOR DRIVING A MIRROR FOR A PHOTOGRAPHIC PRINTER

BACKGROUND OF THE INVENTION

1. Field of the Invention

The present invention relates to a mirror driving method and device for a photographic printer, in which a mirror is moved into and out of a printing light path for light measurement, before printing.

2. Related Art

A photographic printer is known from Japanese Laid-open Patent Application No. 2-278248 (corresponding U.S. Pat. No. 5,006,886), wherein a zoom lens is used as a printing lens for making prints of a predetermined size from photographic films having relatively small sizes, such as 110 film and 135 film, by changing the focal length of the zoom lens according to the film size. When making prints from a film having large frames, such as 120 film, a corresponding fixed focus lens is set in the printing light path in place of the zoom lens. Since such a printing of large frames is not required as frequently, the necessity of changing lenses is reduced, and the efficiency of printing is improved.

In the above-mentioned known photographic printer, the zoom lens is attached at one end thereof with a prism. The prism reflects part of the printing light passing through a photographic film, and directs the reflected light perpendicularly with respect to the printing light path toward a light measuring system. The light measuring system includes a photometric zoom lens and a beam splitter. The focal length of the photometric zoom lens is changed according to the frame size to be printed. The beam splitter divides the light traveling through the photometric zoom lens in half by partially reflecting and transmitting the light. The transmitted light is received on an image sensor for exposure calculation, and the reflected light is received on an image sensor for monitoring.

On the other hand, when a fixed focus lens is set in the printing light path, for example, for printing 120 film, a mirror is placed between the photographic film and the fixed focus lens during light measurement. The mirror reflects the printing light passing through the photographic film and directs the light toward the light measuring system. The mirror is movable diagonally with respect to the printing light path, and is removed from the printing light path during printing.

The above-described photographic printer is of the inverted type wherein photographic paper is disposed above the photographic film. Because the space between the mirror positioned in the printing light path and a film carrier for holding the photographic film is very narrow in this inverted type photographic printer, it is possible that the mirror might cause injury to the operator if the mirror suddenly moves down into the printing light path while the operator handles the photographic film. Even if the operator may not be injured at that time, the operator would be surprised by the sudden downward movement of the mirror.

SUMMARY OF THE INVENTION

In view of the foregoing, an object of the present invention is to prevent the mirror from suddenly moving down to the printing light path.

Another object of the present invention is to prevent the mirror from injuring the operator, while the mirror is moving into the printing light path.

To achieve the above and other objects, the present invention provides a lock mechanism for locking the mirror at a rest position which is removed from the printing light path when the printing is terminated or interrupted. In this way, the mirror is prevented from accidentally moving down to the printing light path and interfering with the operator's handling.

According to a preferred embodiment of the present invention, the mirror is moved by a pulse motor which is controlled by a control device, such that the mirror is moved toward the printing light path, first at a high speed and then at a low speed. Because the mirror moves at a low speed immediately before being inserted into the printing light path, the mirror would not injure the operator, even if the mirror should strike against the operator's hand.

Therefore, the present invention improves the safety of the photographic printer.

BRIEF DESCRIPTION OF THE DRAWINGS

The above and other objects and advantages will become apparent from the following detailed description of the preferred embodiments when read in connection with the accompanying drawings, wherein like parts are designated by the same reference numerals, and wherein.

DETAILED DESCRIPTION OF THE PREFERRED EMBODIMENTS

Figure 1:
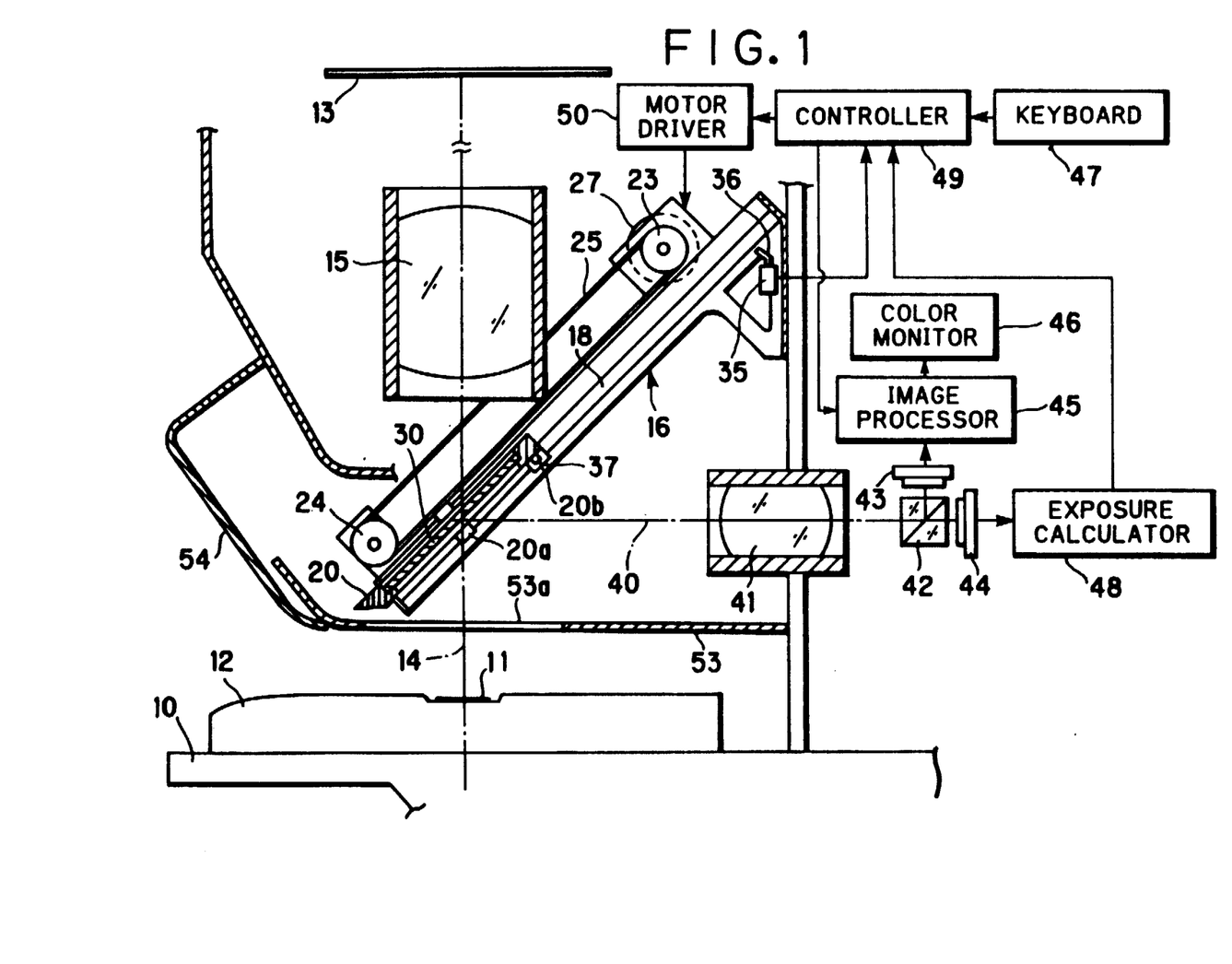
FIG. 1 schematically shows essential parts of a photographic printer according to an embodiment of the present invention, showing an active position of a mirror.

In FIG. 1, a film carrier 12 for holding a photographic film, for example, a negative film 11 is removably disposed on a table 10. Photographic paper 13 is disposed above the negative film 11. Printing light travels along a printing light path 14 and through the negative film 11 toward the photographic paper 13. A printing lens 15 and a mirror unit 16 are placed in the printing light path 14. The printing lens 15 is selected from among a plurality of fixed focus lenses having different focal lengths, in accordance with the frame size of the negative film and the desired print size. However, when printing relatively small sized frames, that is, frames equal to or less than that of 135 film, a zoom lens (not shown) is set in the printing light path 14, in place of the fixed focus lens 15.

Figure 2:
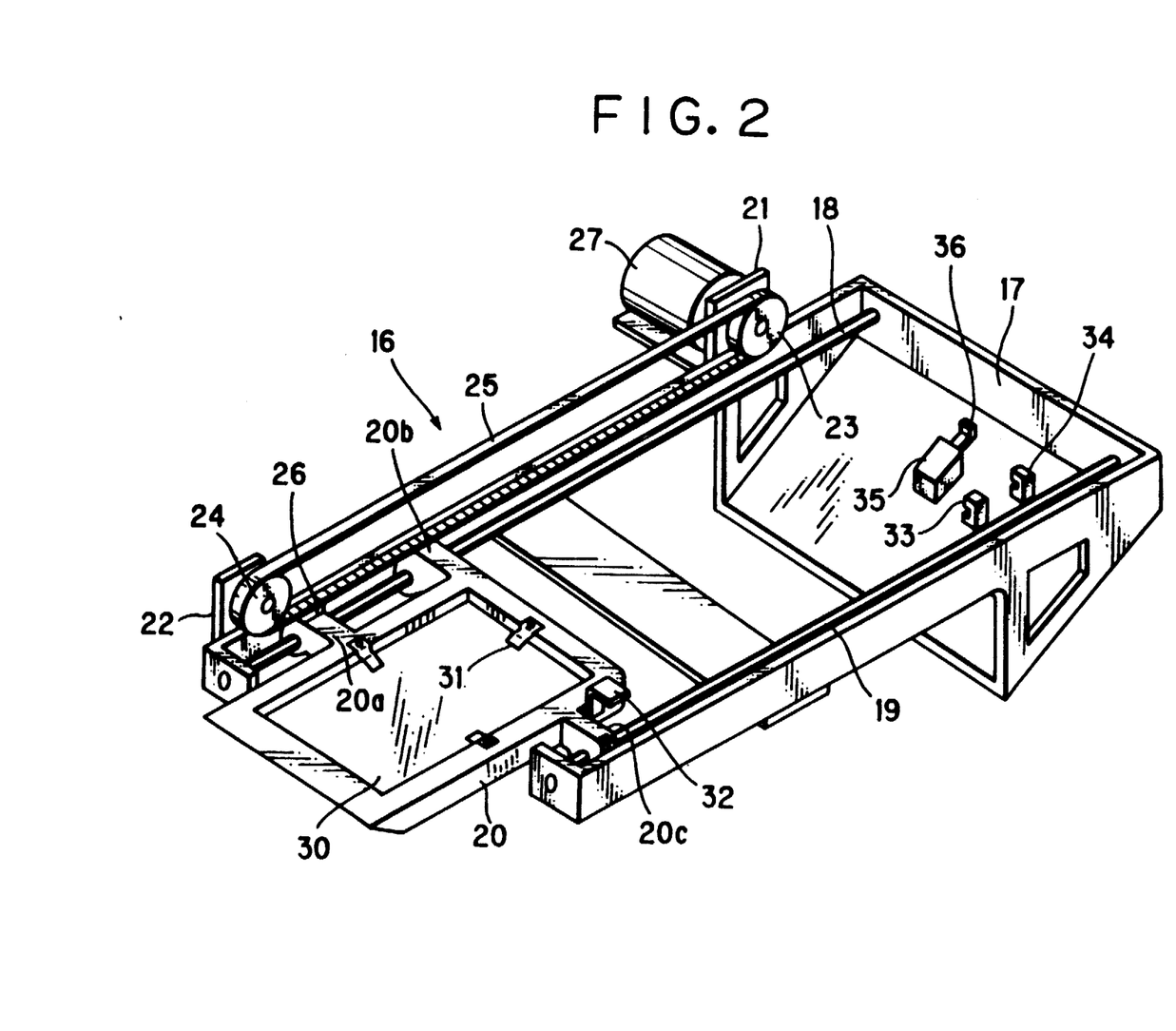
FIG. 2 is a perspective view of a mirror unit for use in the photographic printer of FIG. 1.

As shown in FIG. 2, the mirror unit 16 is constructed by a frame 17 with two guide rods 18 and 19. A mirror holder 20 is engaged at its three arms 20a, 20b and 20c with the guide rods 18 and 19 in a slidable fashion. The frame 17 also includes a pair of pulleys 23 and 24 mounted thereon for conveying a timing belt 25. One pulley 23 is coupled to a pulse motor 27, and the timing belt 25 is secured to the arm 20a through a coupling member 26. Thereby, the mirror holder 20 slides on the guide rods 18 and 19 according to the movement of the timing belt 25, when the pulse motor 27 rotates.

Figure 3:
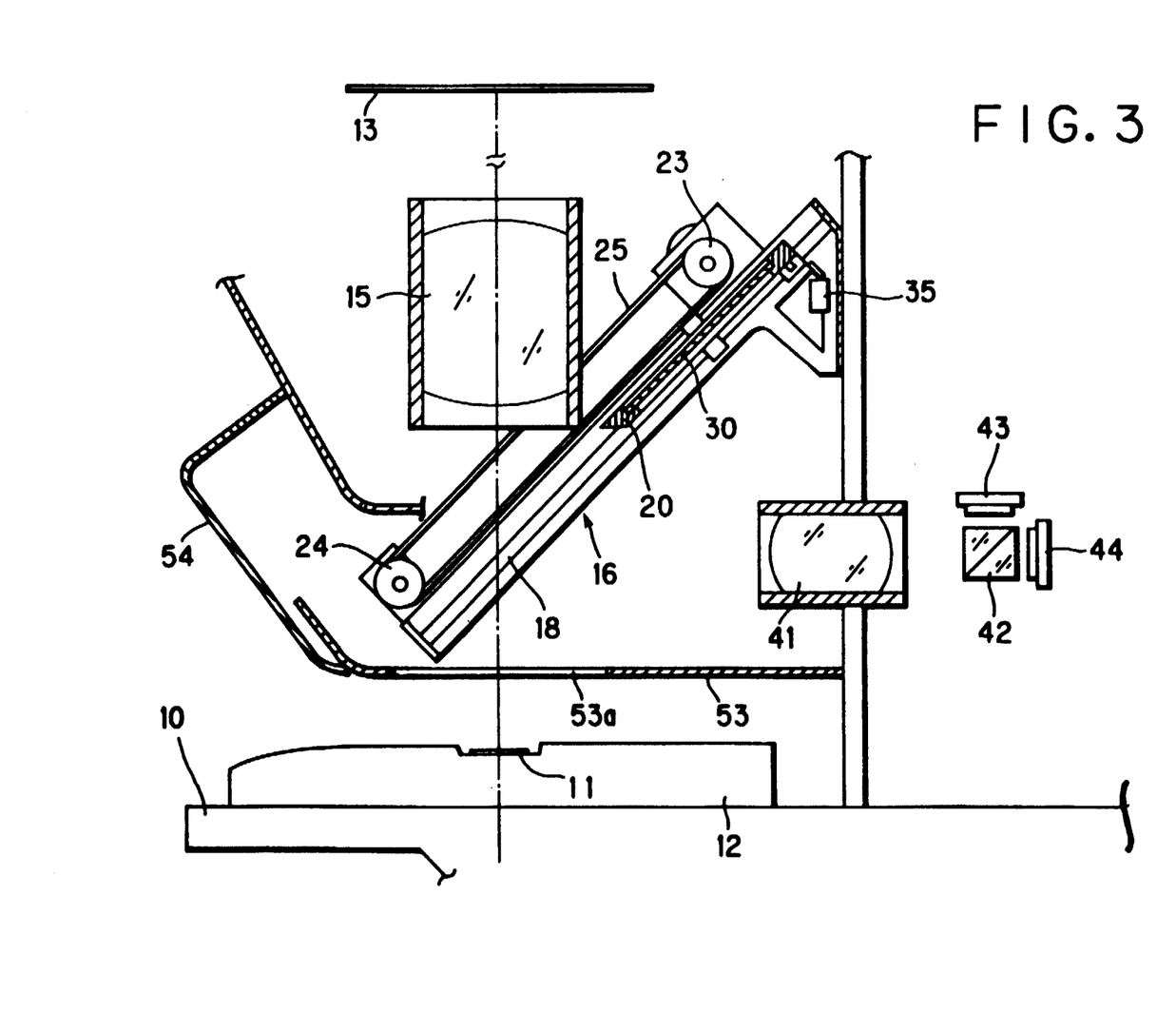
FIG. 3 is a view similar to FIG. 1, but showing a rest position of the mirror.
Figure 4:
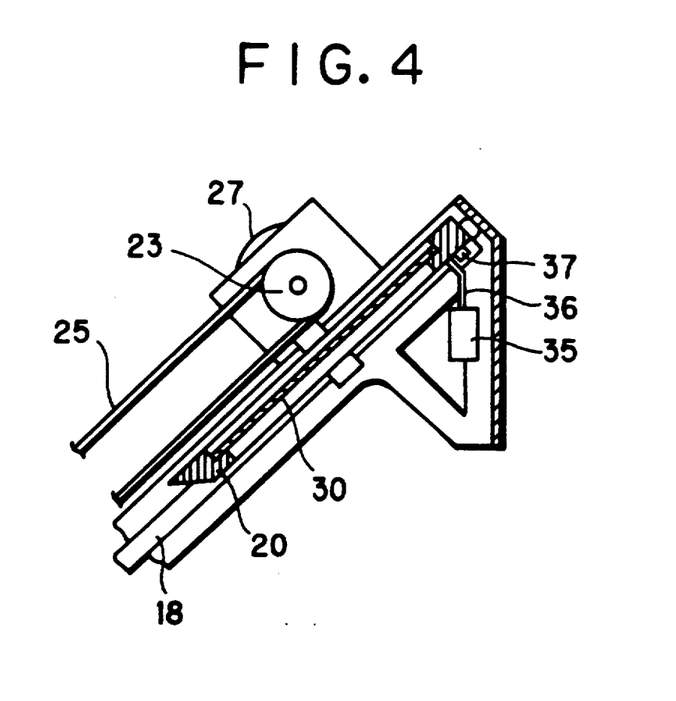
FIG. 4 is a partial section of the mirror unit, showing a lock position of the mirror.

A mirror 30 is fitted in the mirror holder 20, and three holding members 31 press the mirror from the rear surface thereof against the mirror holder 20. The mirror holder 20 is provided with a light-shielding tab 32 for detecting the position of the mirror holder 20. While the light-shielding tab 32 moves together with the mirror holder 20, two photo-interrupters 33 and 34 detect the light shielding tab 32 passing therethrough. The photo-interrupter 33 is adapted to detect the light-shielding tab 32 when the mirror holder 20 moves into a rest position where the mirror 30 is completely removed from the printing light path 14, as shown in FIG. 3. The other photo-interrupter 34 detects that the mirror holder 20 has moved into a lock position as shown in FIG. 4.

In the lock position, a lock lever 36 is engaged with a lug 37 of the mirror holder 20 so as to prevent the mirror holder 20 from accidentally moving down to an active position, that is, the position in the printing light path. The lock lever 36 is caused to engage the lug 37 when a solenoid 35 is turned off.

Referring again to FIG. 1, light reflected from the mirror 30 travels along a photometric light path 40, in which a photometric zoom lens 41 and a beam splitter 42 are disposed. Light reflected from the beam splitter 42 is received on an image sensor 43 for monitoring each image of the negative film 11, whereas light transmitted through the beam splitter 42 is received on an image sensor 44 for exposure calculation. A video signal output from the image sensor 43 is subjected to negative-to-positive conversion, gradation correction, color correction, and other processing in an image processor 45, and thereafter, is sent to a color monitor 46.

Because the color monitor 46 displays a positive color image simulating a finished print of the photographic image, it is possible to perform color and/or density correction with reference to the simulated positive image. The color and density correction is performed by adjusting color correction filters (not shown) through a keyboard 47, in a conventional manner.

The sensor 44 for exposure calculation measures the three color separation signals for red, green and blue of the image to be printed, and sends the signals to an exposure calculator 48. The exposure calculator 48 calculates an exposure value for each color based on the three color separation signals. A controller 49 controls the color correction filters in accordance with the calculated exposure values. The controller 49 also controls the pulse motor 27 through a motor driver 50, and the solenoid 35, and other parts of the photographic printer according to a sequence.

A cover 53 for covering the mirror unit 16, the printing lens 15 and the photometric zoom lens 41 is disposed above and near the film carrier 12. The cover 53 has an opening 53a for allowing the passage of printing light. The cover 53 is also provided with a non-glare plate portion 54. The negative film 11 can be seen through the non-glare plate portion 54 during positioning of the negative film 11 on the film carrier 12.

Figure 5:
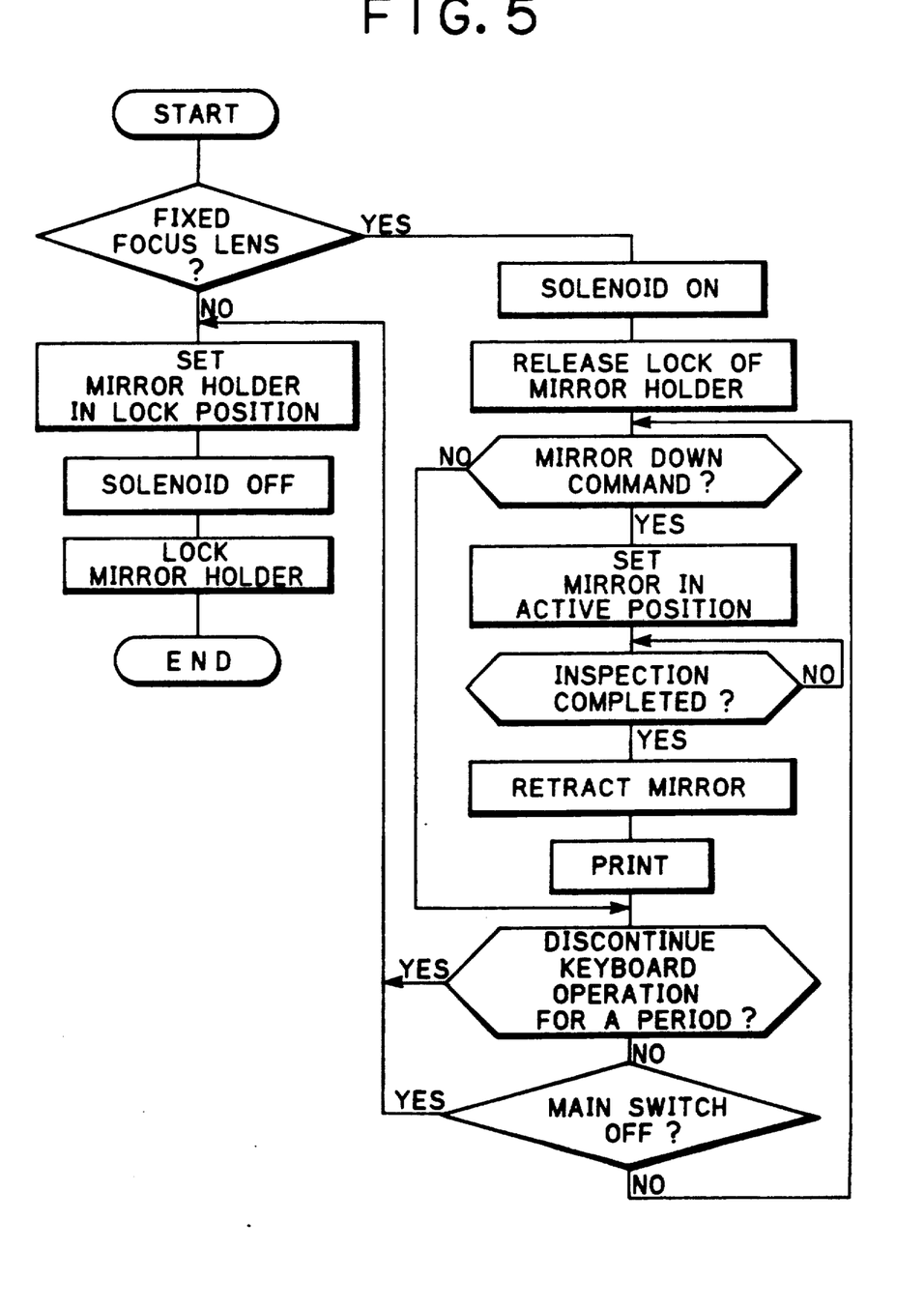
FIG. 5 is a flow chart showing the sequence of mirror positioning during printing.

The operation of the above-described embodiment will now be described. The sequence of the mirror positioning during printing is shown in the flow chart of FIG. 5.

When printing a negative film having large frames, such as a 120 film, the fixed focus lens 15 is placed in the printing light path 14. The film 11 is manually placed on the film carrier 12. At that time, the operator inserts his hand between the film carrier 12 and the cover 53 so as to handle the negative film 11, while viewing the negative film 11 through the non-glare plate portion 54. After the negative film is suitably positioned, the type of the negative film 11 is entered through the keyboard 47. Depending on the film type and the film size, the controller 49 adjusts the focal length of the photometric zoom lens 41, so as to display a simulated positive image of the same size on the monitor 46.

When the printing lens 15 is placed in the printing light path, the solenoid 35 is turned on to disengage the lock lever 36 from the lug 37 of the mirror holder 20. Then, the controller 49 starts rotation of the pulse motor 27 through the motor driver 50, until the photo-interrupter 33 detects the light-shielding tab 32, so as to move the mirror holder 20 from the lock position to the rest position.

In response to a mirror down command entered through the keyboard 47, the controller 49 causes the mirror holder 20 to move into the active position by rotating the pulse motor 27.

Figure 6A:
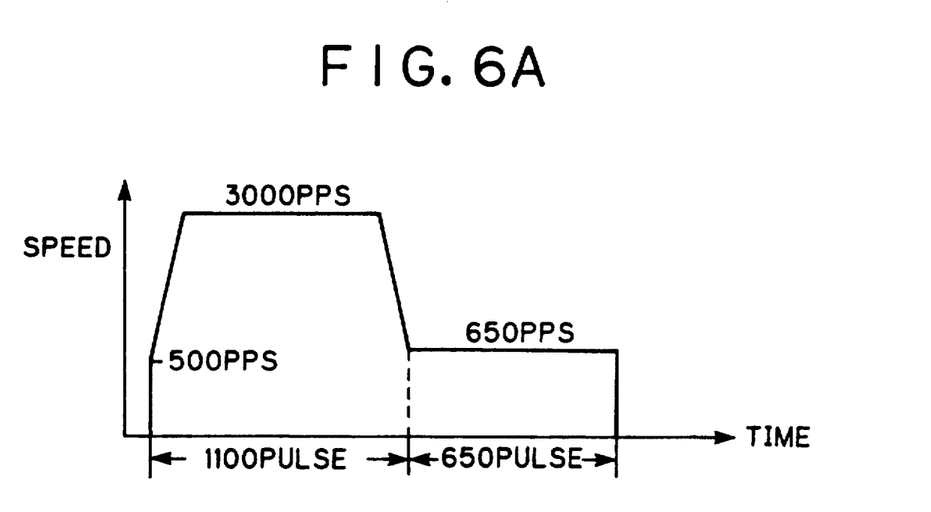
FIGS. 6A and 6B are graphs showing speed control curves of a pulse motor for moving the mirror.

From the standpoint of efficiency, it is preferable to move the mirror holder 20 at a high speed. However, rapid movement of the mirror holder 20 could result in the mirror holder striking against the operator's hand if the operator's hand is at least partially inserted in the opening 53a. To solve this problem, the motor driver 50 controls the speed of the pulse motor 27 in a manner as shown in FIG. 6A, during downward movement of the mirror holder 20. First, the pulse motor 27 is accelerated by changing the frequency of drive pulses applied to the motor 27 from 500 pps (pulse per second) to 3000 pps. Next, a predetermined number of drive pulses are applied to the pulse motor 27 constantly at 3000 pps for a predetermined period. Subsequently, the frequency of the drive pulse is gradually changed from 3000 pps to 650 pps. Thereafter, a predetermined number of pulses are applied to the pulse motor 27 at 650 pps.

In this way, the pulse motor 27 rotates at a high speed by an amount corresponding approximately to 1100 pulses, and thereafter rotates at a low speed by an amount corresponding approximately to 650 pulses. In other words, the mirror holder 20 first moves rapidly, and then slowly immediately before moving into the active position. Therefore, even if the mirror holder 20 should strike against the operator's hand, the mirror holder 20 would not injure his hand, because of the slow movement of the mirror holder 20. Moreover, because the power of the pulse motor 27 is slow during rotation at the low speed, the pulse motor 27 will step out even if the mirror holder 20 strikes against the operator's hand. Therefore, the operator's hand cannot be pinched between the mirror holder 20 and the cover 53.

When the mirror holder 20 is placed in the active position, as shown in FIG. 1, the mirror 30 reflects light having passed through the negative film 11, and directs the reflected light perpendicularly with respect to the printing light path 14 along the photometric light path 40. The reflected light travels through the photometric zoom lens 41 and the beam splitter 42, and is received on the image sensor 43 for monitoring and also on the image sensor 44 for exposure calculation.

The photometric signals from the image sensor 44 are sent to the exposure calculator 48, which then calculates exposure amounts for the three colors. According to the exposure amounts, the color filters are adjusted to control the color balance of the printing light projected toward the negative film 11. The video signal from the image sensor 43 is sent to the color monitor 46 through the image processor 45, so that the color monitor 46 displays a simulated color positive image.

The operator can inspect the negative image with reference to the simulated image on the color monitor 46. If the color balance and/or density of the simulated image is insufficient, the operator corrects the exposure amounts by adjusting the color filters through the keyboard 47. Then, an image simulated under the corrected exposure condition is displayed on the color monitor 46. When a sufficient exposure condition is selected in this way, a printing command is entered through the keyboard 47. Upon the printing command, the controller 49 controls the pulse motor 27 to rotate, through the motor driver 50, so as to move the mirror holder 20 into the rest position.

Figure 6B:
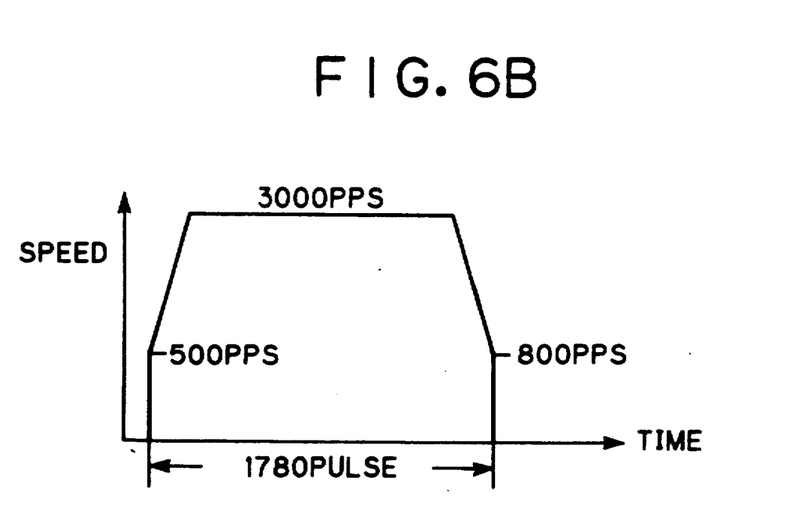

To move the mirror holder 20 from the active position back to the rest position, the pulse motor 27 is rotated at a high speed, as shown in FIG. 6B. Therefore, the mirror holder 20 moves rapidly in this direction.

When the holder 20 moves into the rest position as shown in FIG. 3, the photo-interrupter 33 detects the light-shielding tab 32 and outputs a detection signal. In response to the detection signal, the controller 49 activates a shutter (not shown) so as to print the negative image on the photographic paper 13, in a conventional manner. After printing, the pulse motor 27 is again rotated to move the mirror holder 20 into the active position in the same was as described with reference to FIG. 6A.

Since the keyboard 47 is not operated while the printing is discontinued, the mirror holder 20 is automatically moved into the lock position, if the keyboard 47 has not been operated for a predetermined period. When the mirror holder 20 moves into the lock position, and thus the photo-interrupter 34 outputs a detection signal, the controller 49 turns the solenoid 35 off. Thereby, the lock lever 36 quickly moves out to engage the lug 37 of the mirror holder 20, so that the mirror holder 20 is locked at this position.

Also when a main switch of the photographic printer is turned off to terminate the printing, the mirror holder 20 is automatically moved into and locked at the lock position. Furthermore, when the fixed focus lens 15 is replaced by the zoom lens, the mirror holder 20 is moved into and locked at the lock position, in the same way as above. Also, it is possible to lock the mirror holder 20 at the rest position.

Although the invention has been described in detail above with reference to a preferred embodiment, various modifications within the scope and spirit of the invention will be apparent to people of working skill in this technological field. Thus, the invention should not be considered as limited only by the scope of the appended claims.

What is claimed is:

1. A mirror driving device for a photographic printer, comprising:
   a mirror movable into and out of a printing light path between a photographic film and a printing lens, in a direction diagonal to said printing light path;
   means for moving said mirror between a first position and a second position, wherein said mirror is disposed in said printing light path in said first position, for reflecting light passing through said photographic film and directing the reflected light toward a photometric system of said photographic printer during light measurement, whereas said mirror is disposed out of said printing light path in said second position; and
   a lock mechanism for locking said mirror at said second position.

2. The mirror driving device as recited in claim 1, wherein said lock mechanism is coupled to said photographic printer so as to be activated when operation of the photographic printer is discontinued for a predetermined period.

3. The mirror driving device as recited in claim 2, wherein said lock mechanism is coupled to said photographic printer so as to be activated upon switching off of the photographic printer.

4. The mirror driving device as recited in claim 3, wherein said moving means stops said mirror at a third position during printing, said third position being disposed between said first position and said second position, and moves said mirror further to said second position when said mirror is to be locked.

5. The mirror driving device as recited in claim 4, further comprising mirror position detecting means including a light-shielding member moving along with said mirror; a first photo-interrupter for detecting said light-shielding member when said mirror is in said second position; and a second photo-interrupter for detecting said light-shielding member when said mirror is in said third position.

6. The mirror driving device as recited in claim 4, wherein said lock mechanism includes an engaging member, a solenoid for actuating said engaging member, and a projection secured to said mirror, said engaging member being brought into engagement with said projection so as to lock said mirror at said second position.

7. The mirror driving device as recited in claim 6, wherein said moving means includes a pair of guide rods for supporting said mirror in a slidable fashion, an endless belt secured to a portion of said mirror, a motor for rotating said endless belt, and a controller for controlling rotation of said motor.

8. The mirror driving device as recited in claim 7, wherein said controller controls said motor such that said motor is rotated first at a high speed and then at a low speed when moving said mirror from said third position into said first position.

9. The mirror driving device as recited in claim 8, wherein said controller drives said motor to rotate at a high speed when moving said mirror from said first position to said second position.

10. A mirror driving device in a photographic printer, comprising:
    a mirror movable into and out of a printing light path between a photographic film and a printing lens, in a direction diagonal to said printing light path; and
    means for moving said mirror between a first position and a second position, wherein said mirror is disposed in said printing light path in said first position, for reflecting light passing through said photographic film and directing the reflected light toward a photometric system of said photographic printer during light measurement, whereas said mirror is disposed out of said printing light path in said second position; and wherein said moving means moves said mirror first at a high speed and then at a low speed when moving said mirror from said second position into said first position.

11. The mirror driving device as recited in claim 10, wherein said moving means moves said mirror at a high speed when moving said mirror from said first position to said second position.

12. The mirror driving device as recited in claim 11, wherein said moving means includes a pair of guide rods for supporting said mirror in a slidable fashion, an endless belt secured to a portion of said mirror, a motor for rotating said endless belt, and a controller for controlling rotation of said motor.

13. The mirror driving device as recited in claim 12, wherein said motor is a pulse motor, and said controller applies 1100 pulses at a maximum frequency of 3000 pps, and then 650 pulses at a frequency of 650 pps to said pulse motor for moving said mirror into said first position.

14. The mirror driving device as recited in claim 13, wherein 1780 pulses are applied to said pulse motor at a maximum frequency of 3000 pps for removing said mirror from said first position.

15. A mirror driving method for a photographic printer, comprising the steps of:
  moving a mirror into a printing light path between a photographic film and a printing lens, in a direction diagonal to said printing light path, for reflecting light passing through said photographic film and directing the reflected light toward a photometric system of said photographic printer during light measurement; and thereafter
  removing said mirror from said printing light path; and
  wherein said mirror is moved first at a high speed and then at a low speed when being moved into said printing light path.

16. The mirror driving method as recited in claim 15, wherein said mirror is removed from said printing light path at a high speed.

17. The mirror driving method as recited in claim 16, wherein said mirror is driven by a pulse motor, and said method further comprises the steps of:
  applying 1100 pulses at a maximum frequency of 3000 pps, and then 650 pulses at a frequency of 650 pps to said pulse motor, for moving said mirror into said printing light path; and
  applying 1780 pulses to said pulse motor at a maximum frequency of 3000 pps, for removing said mirror from said printing light path.

* * * * *